United States Patent [19]

Weinblatt

[11] Patent Number: 4,781,596

[45] Date of Patent: Nov. 1, 1988

[54] SURVEY TECHNIQUE FOR READERSHIP OF PUBLICATIONS

[76] Inventor: Lee S. Weinblatt, 797 Winthrop Rd., Teaneck, N.J. 07666

[21] Appl. No.: 874,483

[22] Filed: Jun. 16, 1986

[51] Int. Cl.⁴ .............................................. G09B 5/00
[52] U.S. Cl. ..................................... 434/236; 235/472
[58] Field of Search ................ 434/236; 340/568, 572, 340/573, 825.3; 235/472

[56] References Cited

U.S. PATENT DOCUMENTS

| | | | |
|---|---|---|---|
| 4,471,218 | 9/1984 | Culp | 235/472 |
| 4,628,193 | 12/1986 | Blum | 235/472 |
| 4,647,917 | 3/1987 | Anderson, III et al. | 340/572 |
| 4,659,314 | 4/1987 | Weinblatt | 434/236 |

OTHER PUBLICATIONS

"Videx", *Time Wand Keeping Track of Time*, Jun.-/Feb./86, Bar Code News.
Videx Timewand (Advertisement published in A+ Magazine, Jul. 1986, p. 62).

*Primary Examiner*—Leo P. Picard
*Attorney, Agent, or Firm*—Frishauf, Holtz, Goodman & Woodward

[57] ABSTRACT

A technique for surveying the readership of selected magazines. Individuals acting as test subjects carry a light portable device capable of detecting bar codes printed on at least the front cover of the magazine copy. The bar code acquired by the pen includes circuitry for comparing it with stored bar codes. The comparison is utilized to determine whether the magazine of interest, and certain portions of interest in it, for which codes have been stored in the pen, are being read. If so, then this information is stored in the pen for later retrieval and analysis.

23 Claims, 5 Drawing Sheets

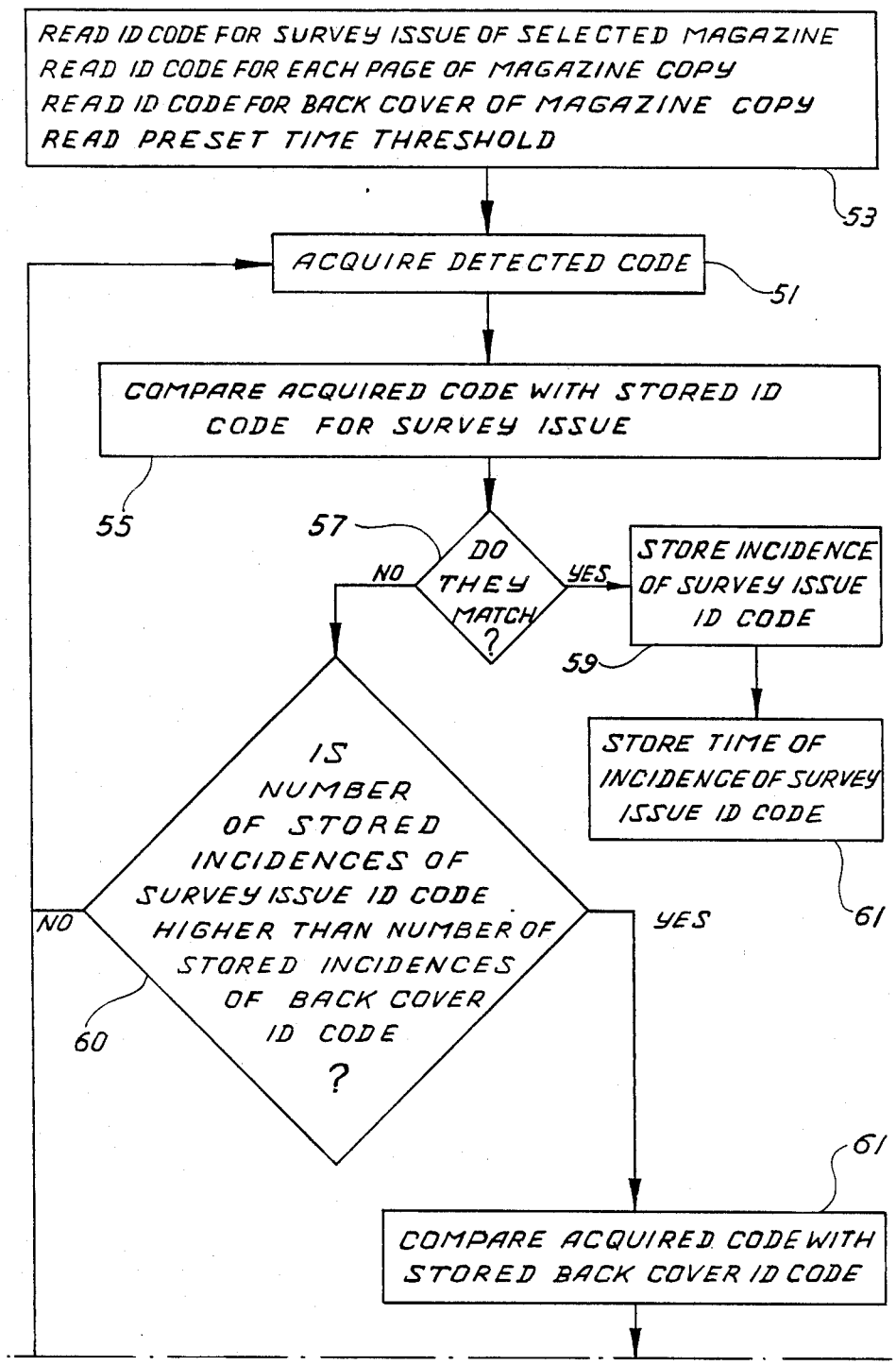

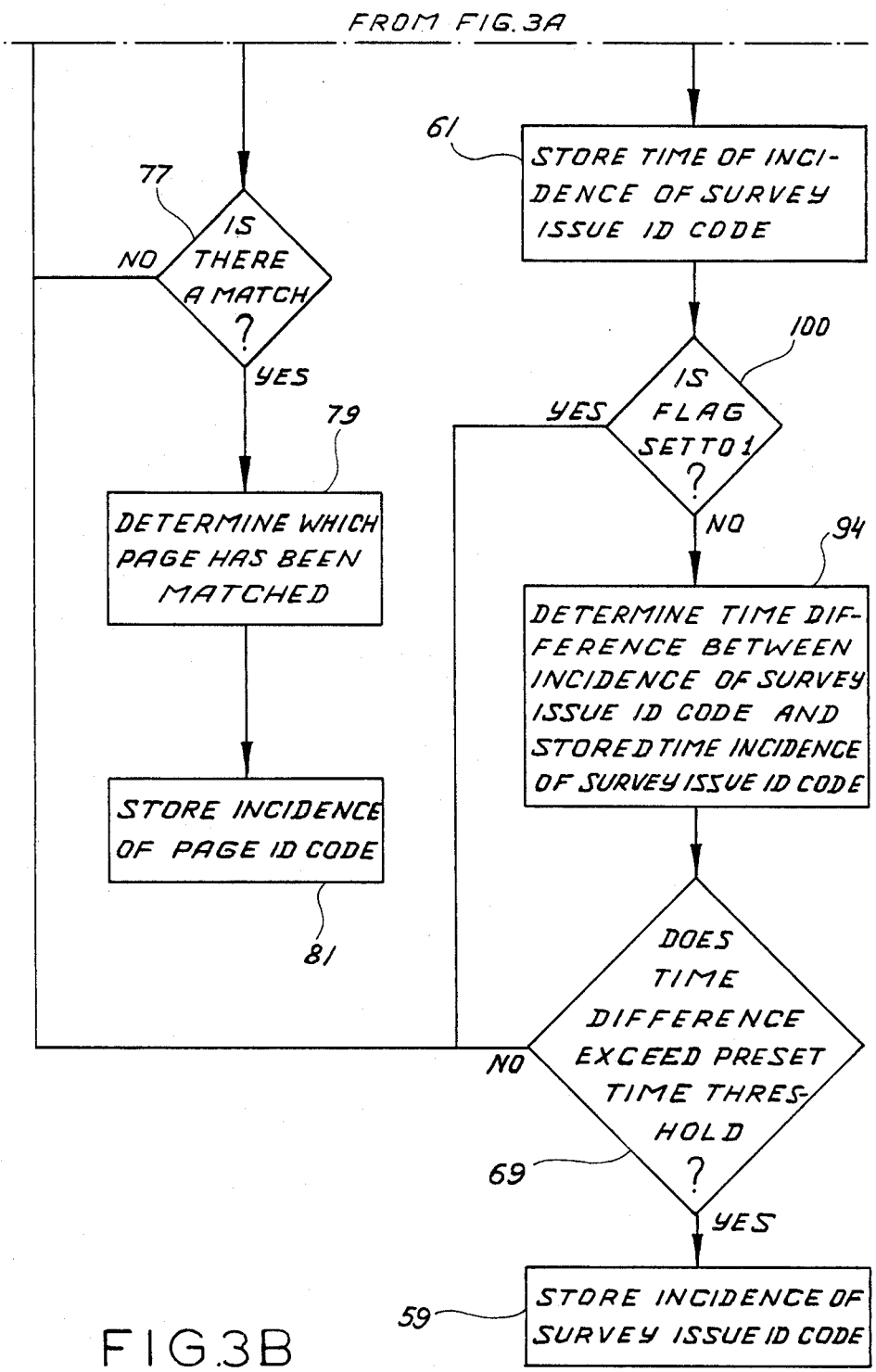

SURVEY TECHNIQUE FOR READERSHIP OF PUBLICATIONS

BACKGROUND OF THE INVENTION

This invention is related to a technique for monitoring the exposure of selected publications to readers and, more particularly, to an accurate, reliable electronic technique for determining whether an individual who has been selected as a test subject actually handled any of the selected publications and read through its pages.

Various techniques are no in use to determine the readership of selected publications. Such publications are typically magazines. The term "magazines" will be used hereinafter to include any type of publication. Publishers and advertisers require this information in order to determine readership which, in turn, is useful to set printing runs, establish advertising rates, indicate geographic areas for concentrating resources, and provide an analysis of economic and social categories of the readership, and the like.

Primary readers are relatively easy to ascertain because it is to these that the magazine is directly mailed o sold. However, the number of secondary readers is thought to far exceed that of primary readers. Secondary readers are, for example, household members, barbershop patrons, plane passengers, and the like. It is estimated that each magazine is read by five such secondary readers. To uncover these secondary readers, several techniques are currently available.

Firstly, individuals are contacted personally and interviewed as to their magazine preferences. In one approach, the individual is shown a particular issue of a selected magazine and asked whether he has read that issue recently. In another approach, the individual is shown a magazine logo and asked whether he has read that magazine during the past, for example, month. Both of these methods are inaccurate because each relies on memory recall of the individuals. This has been shown to be suspect as insufficiently accurate and, moreover, once the interviewer reveals the magazine in which he is interested, the selected individual being interviewed may develop a subjective inclination in favor of that magazine in his answers which may not in fact reflect the truth.

Secondly, a number of volunteers or paid individuals are collected who are expected to keep a diary of their reading habits. The diaries are then retrieved periodically from the individuals, and analyzed. However, this approach relies exclusively on the accurate and complete record keeping of the particular individuals involved. Unfortunately, this also tends to be unreliable because people occasionally forget to make entries, they may be distracted from doing it, or they may simply not be inclined to make an entry at any given time. Therefore, this technique is also suspect as to its accuracy and reliability.

In addition to the aim of surveying the readership of a particular magazine, it is also highly desirable to determine which portions of the magazine have been read. For example, an advertiser may wish to know to what extent the readers of a particular issue were drawn to that advertiser's ad. The effectiveness of the ad in general, and in that issue in particular, can then be assessed. However, none of the magazine surveying techniques currently in use provide this service.

One new technique which has been proposed for surveying magazine readership is disclosed in U.S. patent application Ser. No. 827,757 filed Feb. 7, 1986 by the same applicant. It utilizes a card of the type commonly found stapled into magazines. Incorporated into this card is electronic circuitry which emits a certain signal that can be picked up by a portable receiver carried by the test subject. Although this approach provides a significant improvement in terms of accuracy and reliability over known approaches, it introduces an additional cost factor. Even though the card insert may cost only several cents, when this is multiplied by millions of copies of a particular magazine issue, a significant expenditure must be undertaken.

SUMMARY OF THE INVENTION

It is a primary object of the present invention to provide a technique for surveying magazine readership which provides results with improved accuracy and reliability.

Another object of the present invention is to provide a technique for surveying the readership of magazines without relying on the memory of the selected individuals who are test subjects.

A further object of the present invention is to provide a technique for surveying the readership of selected magazines without predisposing the individual test subject to a particular magazine.

Yet another object of the present invention is to provide a technique for surveying the readership of magazines electronically and without the need to conduct interviews or keep diaries.

Still another object of the present invention is to provide a technique for surveying the readership of magazines which can be done at a relatively low cost.

One other object of the present invention is to provide a technique for surveying the readership of selected magazines which can provide information regarding the attention paid by the reader to particular portions inside the magazine, such as advertisements.

These and other objects of the present invention are attained by an electronic apparatus for recording data indicative of a magazine having been read, the magazine having an identification code of a selected type associated therewith, comprising detecting means manually manipulable for sensing a code of the selected type, means coupled to the detecting means for determining whether the sensed code corresponds to a magazine identification code, and memory means coupled to the determining means for storing a data signal when it is determined by the determination means that a magazine identification code has been sensed by the detecting means.

Another aspect of the invention is directed to a method for recording data indicative of a magazine having been read, the magazine having an identification code of a selected type associated therewith, comprising the steps of sensing a code of the selected type with a manually manipulable means, determining whether the sensed code corresponds to a magazine identification code, and storing a data signal when it is determined that a magazine identification code has been sensed.

A further aspect of the invention is directed to an electronic apparatus for monitoring a selected magazine as to its readership by individuals acting as test subjects involving a survey issue having a first code associated therewith, comprising sensing means manipulable by the test subjects for detecting the first code of a magazine, first memory means for storing a reference code related to the first code, means for comparing the detected first code with the reference code to generate a control signal when a correspondence is found therebetween, and second memory means for storing a data signal in response to generation of the control signal by the comparing means.

Yet another aspect of the invention is directed to a method for monitoring a selected magazine as to its readership by individuals selected as test subjects involving a survey issue having a first code associated therewith, comprising the steps of detecting the first code of a magazine storing a reference code related to the first code, comparing the detected first code with the reference code to generate a control signal when a correspondence is found therebetween, and storing a data signal in response to generation of the control signal.

Still another aspect of the invention is directed to an apparatus for monitoring a selected magazine as to its readership by individuals acting as test subjects involving a survey issue having an identification code of a selected type of code associated therewith, comprising an electronic portable unit manually manipulable by the test subjects to read a code on a magazine including means for detecting a code of the selected type and memory means to store a data signal when the detecting means senses the identification code, an electronic base unit including second memory means for storing the data signals stored in the portable unit, and means to transfer the stored data signals from the portable unit to the base unit.

One further aspect of the invention is directed to a method for monitoring a selected magazine as to its readership by individuals acting as test subjects involving a survey issue having an identification code of a selected type of code associated therewith, comprising the steps of manually manipulating an electronic portable unit by the test subjects to read a code on a magazine for detecting a code of the selected type, storing a data signal when the identification code is detected, transferring the stored data signals from the portable unit to the base unit, and storing the transferred data signals in the base unit.

DETAILED DESCRIPTION OF THE PREFERRED EMBODIMENTS

Figure 1:
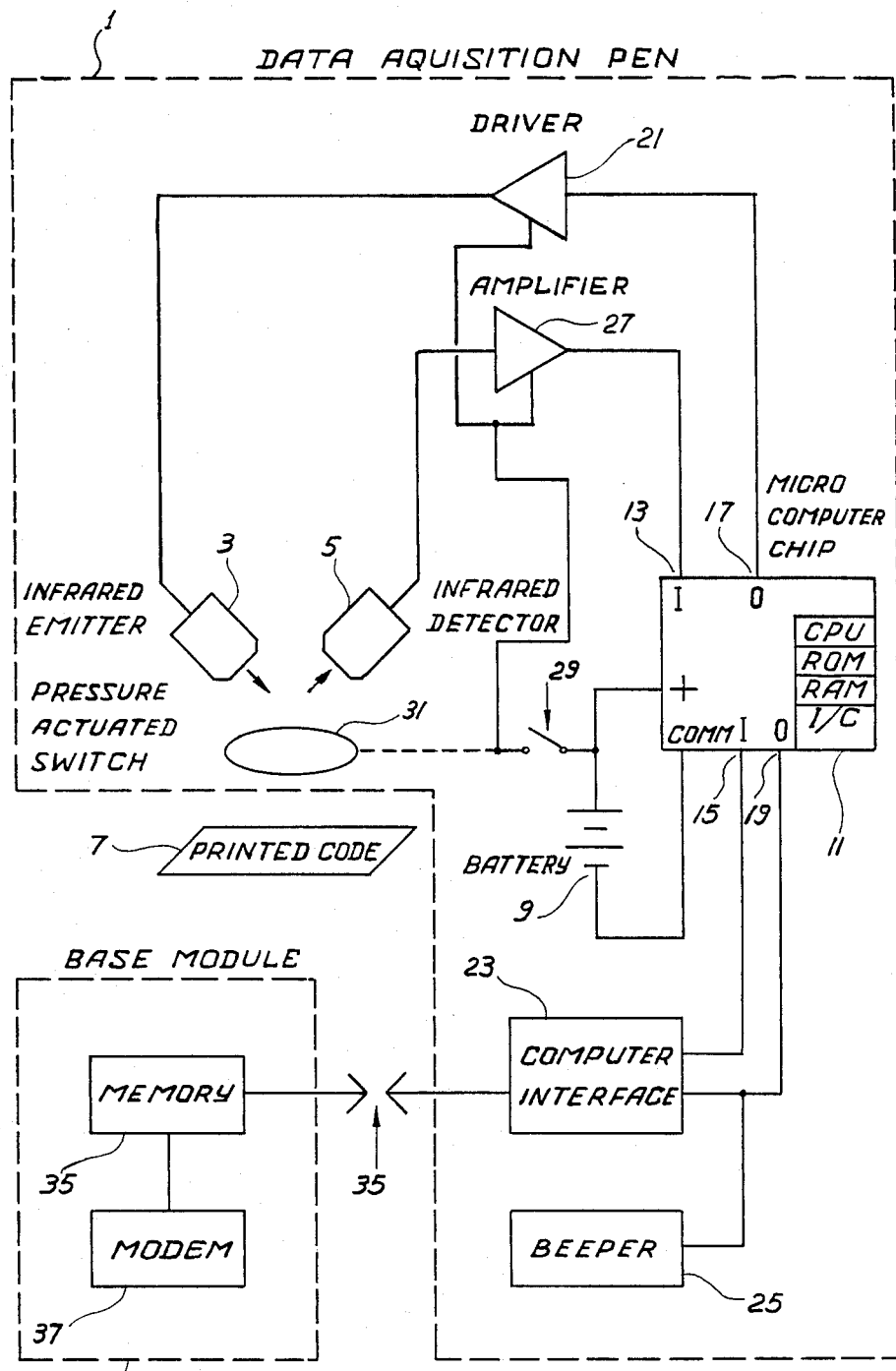
FIG. 1 is a schematic drawing partly in block diagram form of the circuitry of the invention.

Bar codes are in widespread usage on a large variety of items. The technology for establishing a unique bar code, printing it, and reading it is well established. A common example of its usage is with grocery items. At the checkout counter, each item imprinted with a bar code is passed over a reader which detects the bar code, identifies it, and outputs the price of the item. Abacus Systems of Lacrosse, Wis. markets a software product under the name Retail Supervisor which can be combined with a bar code reader model No. 9320 from Intermec Corp. of Linwood, Wash. to perform these functions.

Such bar code technology is put to advantageous use in accordance with the present invention. It is contemplated that a bar code will be imprinted in selected locations in copies of magazine issues selected for the survey. For example, if the January issue of Time Magazine is to be the subject of a survey, then a unique bar code is assigned to that issue ("survey issue") of the magazine ("selected magazine"). If a survey of Time magazine readership is to be conducted for another issue, then it will be assigned its own unique bar code. Likewise, if another magazine is to be surveyed, it will also be assigned its unique bar code. Thus, from this survey issue bar code, it is possible to determine to which issue of which magazine it was affixed.

A unique, but simpler, bar code is likewise affixed to every page which is of possible interest. It is not necessary to use as lengthy a code for the pages as for identifying the magazine because less information is involved. A saving in terms of memory space is also attained if a simpler code is used. If a certain ad appears on, say, page 25 which the advertiser and/or magazine publisher want to monitor, page 25 will be assigned a unique bar code. Page 25 in all copies of the survey issue will have imprinted thereon the same bar code. Also, it may be desirable to monitor the extent to which certain articles are read to provide feedback of the kind of subject matter which attracts the readers of that particular magazine. Many other reasons can be conceived of for which the monitoring of readership of certain pages would be highly useful. Of course, each page of the magazine could be assigned its unique bar code so that every page can be monitored. In fact if it is anticipated that this magazine will have other of its issues surveyed as well, then the same bar code unique to each page can be assigned for every issue of that magazine. The page bar code then will be unique only as related to other pages of that particular survey issue. However, every copy of that selected magazine will have the same bar code for corresponding pages. Nevertheless, each page will be uniquely identifiable when combined with the unique bar code assigned to each survey issue. If, however, it is not anticipated that future issues of the selected magazine will be surveyed, then it may be simpler under certain circumstances to simply affix unique bar codes to only certain pages which are of most interest in that survey issue of the selected magazine.

Regardless of which of the two just-discussed approaches of affixing unique bar codes to the magazine pages is picked, the cost involved in actually printing the bar code on the magazine is relatively quite low. The bar code can be printed with normal ink used for forming the other alphanumeric characters in the magazine. No special procedures other than those already well developed and in widespread use for selecting and affixing such bar codes need be utilized. Consequently, cost is not as significant a factor with this invention as it is, for example, with the approach utilized in the above-mentioned U.S. patent application Ser. No. 827,757.

In order to provide measurements for the survey, individuals are approached to act as test subjects. The individuals should be told as little information about the purpose of the survey as possible so as not to prejudice them in favor of or against reading the selected magazine. For example, they may need only to be told that a contest is being conducted involving bar codes imprinted on magazines. A prize will be promised to the individual who finds a particular bar code. Each test subject will be given a device, discussed in detail below, for reading and storing the bar codes on magazines read by that individual. However, to avoid the situation of the test subject skipping from magazine to magazine and quickly flipping through the magazine pages to maximize the amount of bar codes stored in the device assigned to him, he might be told that the contest is associated with magazine readership, and that a minimal amount of time (which he may or may not be told) must be spent on each magazine in order for the bar codes read by the device to actually be stored for eligibility in the contest. This is merely one idea out of many possible ones that can be used to secure the cooperation of individuals to participate in the survey.

Each test subject is given a device which is compact and light so that it is easy to carry and convenient to use in reading bar codes. Such a device can, for example, be in the shape of a pen or a cigarette lighter. For purposes of the discussion below, only a pen will be referred to.

As shown in FIG. 1, data acquisition pen 1 (shape not shown) has at its tip an infrared emitter 3 and a cooperating infrared detector 5. The infrared emitter is aimed outwardly of the opening (not shown) of the tip of the pen so that it can bounce light off the printed code 7 when the pen 1 is brought near it. As the light from emitter 3 bounces off code 7, it will be picked up by infrared detector 5.

Secured in the interior of pen 1 is circuitry for actuating emitter 3, receiving signals from detector 5, interpreting these signals, and storing them for later use. Battery 9 powers this circuitry and can be, for example, a lithium battery of a well known type such as used by Kodak in its disc cameras. Its characteristics are long life (five years) and reliable operation. A microcomputer chip 11 includes a ROM (Read Only Memory) section, a RAM (Random Access Memory), a central processing unit (CPU) section, and an input/output (I/O) section. Such microcomputer chips are off-the-shelf items which are well known and in widespread usage. The ROM stores certain data needed for the operation of the pen, as explained in greater detail below in connection with FIG. 2. The CPU section performs operations in accordance with the flow chart to retrieve data from the ROM and RAM, store data in the RAM, and direct signals to I/O, as explained in detail below in connection also with FIG. 2.

Microcomputer chip 11 includes input ports 13 and 15 as well as output ports 17 and 19 coupled to the I/O section. Output 17 feeds a signal to a driver 21 for powering the infrared emiter 3. Output 19 is connected to computer interface 23 and a beeper 25. The function of computer interface 23 will be explained below. A beeper 25 is actuated when a bar code from printed code 7 is accepted as legitimate, at least in terms of the number of its constituents, so that the test subject knows that he has properly passed the pen won over the printed code.

Input 13 receives the signal from infrared detector 5 via amplifier 27. Switch 29 closes a circuit from battery 9 to driver 21 and amplifier 27. With switch 29 open, no power is supplied to driver 21 and amplifier 27 and, therefore, these circuits of data acquisition pen 1 are inactive. Pressure actuated switch 31 is mechanically linked to switch 29 in order to operate it. Pressure actuated switch 31 can be, for example at the tip of pen 1 so that it can be actuated by pressing down on the pen when the pen is aligned over printed code 7. Switch 29 is normally in its open position in order to conserve battery power Actuation of switch 31 closes switch 29 so that current from battery 9 to circuits 21 and 27 only flows when it is needed to read a bar code. However, battery 9 is continually connected to power microcomputer chip 11. It operates regardless of the state of switch 29.

Data acquisition pen 1 is designed to fit within a base module 33 (shape not shown). Base module 33 is constructed so as to accommodate within itself pen 1 in a docking arrangement. This means that contacts are provided at the end of pen 1 remote from the tip carrying emitter 3 and detector 5. These contacts cooperate with corresponding contacts on base module 33. This arrangement of contacts is schematically represented by numeral 35 in FIG. 1. The base module is suitably designed so that it includes an opening for maintaining pen 1 in such a position that the contacts 35 come into engagement when pen 1 is seated in base module 33. Such an arrangement is well known and, accordingly, no further details are deemed necessary.

Base module 33 also includes a memory 35 which has a capacity sufficient to accommodate the expected amount of information collected by pen 1 over a period of several days. The memory storage capacity of the RAM section in microcomputer chip 11 will store only a few days' worth of information. When at the end of the day pen 1 is seated in base module 33 and contacts 35 come into engagement, computer interface 23 will dump the contacts from the RAM section in microcomputer chip 11 into memory 35 of base module 33. This can be done manually with a separate switch or automatically by a suitable mechanism and associated circuitry which are activated when the pen is seated in the base module. It is believed that no further details on this well known arrangement are necessary. A remote computer (not shown) can access memory 35 via modem 37 to retrieve all the information stored in memory 35. Memory 35, modem 37, and the arrangement for retrieving the information from a remote computer are all techniques and apparatus generally available for quite some time and well known in the art. Accordingly, no further details are deemed necessary.

Once armed with data acquisition pen 1 and information on how to use it, the individual test subjects go about their normal daily activities. If in the course of such activities, such an individual should encounter a magazine which he wishes to peruse, he scans with pen 1 the bar code printed o the magazine front cover. The bar code is acquired by microcomputer chip 11 in accordance with step 51 shown in FIG. 2. This corresponds to the operations of emitter 3, detector 5, driver 21, amplifier 27, switch 29 and chip 11 discussed above in connection with FIG. 1. Preceding this, certain formation will have already been stored into the ROM section of computer chip 11. This is represented by box 53 in FIG. 2. Such information includes the identification ("ID") code for the particular survey issue of the selected magazine. As stated above, this ID code is preferably a bar code which would normally be affixed to the front cover of the magazine copy. Also, the ID code for each page of interest in the magazine copy is preferably a bar code, and will also have been stored. Likewise, a special ID code for the back cover of the magazine copy is preferably a bar code, and is also stored.

The bar code detected by pen 1 is compared with the information just discussed in connection with box 53 which has been previously stored in the ROM section. The first step is carried out in accordance with box 55. A determination is then made in accordance with decision box 57 of whether the acquired bar code matches the ID code stored for the survey copy. If a match is found, then a survey issue incidence indication is stored in RAM in accordance with box 59. Such an incidence indication might be the incrementation of a number in an assigned address of the RAM. Every time the incidence of the ID code for the survey issue occurs, that number will be incremented by one. Furthermore, when the incidence is detected, the time of its detection is also determined in accordance with box 61. This time may, but need not, be the correct time of day. Instead, it can simply be the starting of a clock so that additional determinations of time which follow, as explained below, will be related to this incidence time for the detection of a survey issue ID code.

Returning to box 57, if a match between the acquired code and the stored survey issue ID code is not found, the program proceeds to decision box 60. Because an explanation of what occurs in this decision box involves certain, as yet unexplained features of the invention, it is preferable to delay a description of it to a later point.

Proceeding now to box 61, a comparison is conducted between the acquired code and the stored back cover ID code. If a match is found in accordance with decision box 63, then the time of occurrence for this back cover incidence is determined per box 65. This just-mentioned time is compared in box 67 with the above-mentioned time determined for the incidence of the survey issue ID code. A time difference is thereby obtained which reveals how much time the individual test subject spent in proceeding from the front cover of the magazine copy of the survey issue to the back. A preset threshold duration is established in order to prevent the above-mentioned situation of having test subjects peremptorily rifle through magazines in order to maximize the number of codes stored in their assigned pen. It must be kept in mind that the object of the survey is to assess the extent to which the magazine is read. Clearly, the magazine cannot be considered as having been "read" unless a certain amount of time is spent on it between covers. This preset time threshold is selected by, say, the magazine publisher to correspond to the average time a person should spend on this magazine survey issue. The preset time threshold is stored in the ROM. If the time difference between the incidence of the survey issue ID code and the back cover ID code exceeds the preset time threshold, as determined in decision box 69, then the incidence of the back cover ID code is stored in a dedicated address location. As in the case of storing the incidence of the survey issue ID code per box 59, storing the incidence of the back cover ID code per box 71 involves incrementing by one the number in a designated memory address. If, however, the preset time threshold is not met, the program proceeds to box 73 which operates to subtract one incidence of the survey issue ID code from the memory address location mentioned in connection with box 59. Consequently, an incidence of magazine readership will not be recognized for the survey unless the individual test subject has spent the amount of time required on the magazine as by the preset time threshold. After this operation is completed, the program waits for the acquisition of the next code per box 51.

Returning now to decision box 63, it should be recalled that the program reached this point by failing to find a match between the acquired code and the survey issue ID code imprinted on the front cover of the magazine copy. If in testing for a match between the acquired code and the stored back cover ID code no match is found per box 63, then a comparison is made in box 7 between the acquired code and all of the stored codes for the pages inside the magazine copy. If no match is found in decision box 77, then the program returns to box 51. If, however, a match is found, then the page which has been identified in box 79 is stored in suitable memory address locations in accordance with box 81. Each page is assigned its own memory address so that an incidence of that page involves incrementing the number in that memory location by one, as explained above in connection with boxes 59 and 71.

With all of the above having been disclosed, it is now appropriate to discuss decision box 60. The operational steps involved in reaching it determine only whether a match exists between the survey issue ID code and the acquired code. If not, then decision box 60 determines whether the number stored in the address location which stores the incidence of survey issue ID code per box 59 exceeds the number in the address location which stores the incidence of the back cover ID code perbox 71. If it does, then this reveals in effect that the survey magazine is in the process of being read. The only way such a situation could exist, assuming the test subject follows instructions to scan the bar code on at least the front and back covers, is if the survey issue ID code from the front cover had been acquired and stored, but not yet the back cover ID code. In other words, the front cover has been passed but the back cover has not yet been reached. Decision box 60 checks for the presence of this situation before it allows the procedure to continue to a recognition of the page codes. Otherwise, without such a test, it would be possible to enter page codes from all magazines, even the non-survey issue, once a survey issue has been read because nothing would "close" the open "gate" for admitting such information into memory. With decision box 60, when the back cover ID code is stored so that the inequality no longer exists, the proper survey issue ID code must be acquired and stored before further steps can be taken.

As far as advertising value is concerned, the back cover page is one of the most valuable, if not the most valuable, pages in the magazine. It may be, therefore, that the advertiser will prefer not to have an imprinted bar code because it will detract from the advertisement. Therefore, an alternative must be provided to the above-described use of a bar code imprinted on the back cover page. One such alternative is to use another page towards the back of the magazine. The same ID code that would have been used for the back cover will be imprinted on this relatively high-number page. The functions performed in accordance with the routines in boxes 61, 65, 67, 69 and 71 will apply to this page rather than the back cover page. It may be somewhat awkward, however, to use this approach when a universal technique applicable to many magazines is preferred. Magazines vary as to their length to quite a degree. Therefore, it is difficult to select a page which is toward the end of one magazine but which will not be beyond the end of another magazine. Accordingly, an alternative approach is to scan the bar code on the front cover which identifies the survey issue when the reader finishes the magazine as well as when he starts it. This approach is explained below with respect to FIG. 3.

Figure 2B:
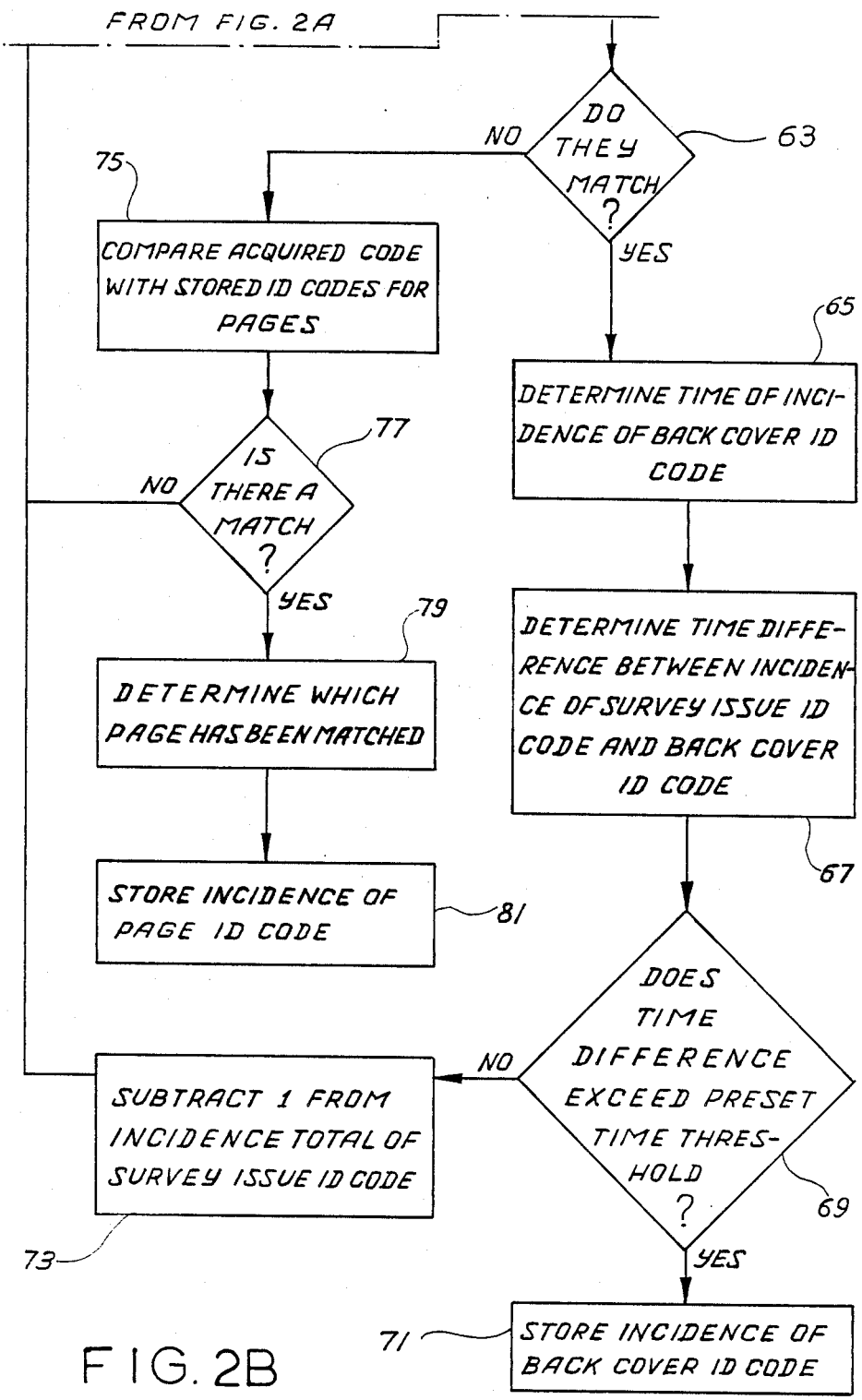
FIG. 2 is a flow chart for programming the microcomputer chip shown in FIG. 1 in accordance with a first embodiment.
Figures 3A, 3B:
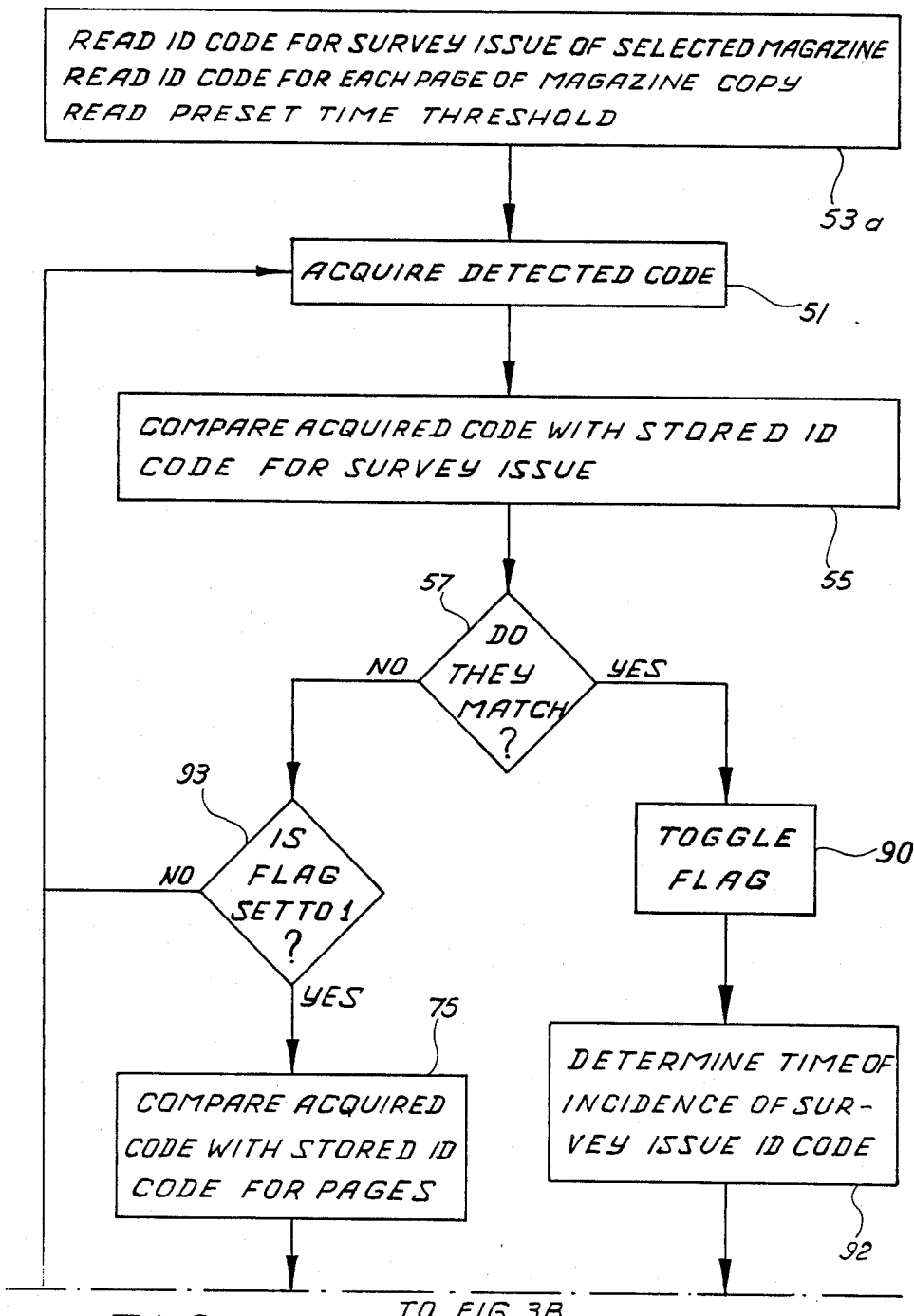
FIG. 3 is a flow chart for programming the microcomputer chip shown in FIG. 1 in accordance with a second embodiment.

Routines performed in accordance with the embodiment of FIG. 3 which are identical to those performed in FIG. 2 are enclosed in the same-numbered boxes. Since a back cover ID code is not required for the FIG. 3 approach, box 53a does not include it. The detected code is acquired in accordance with box 51 and compared with stored ID codes for the survey issue in accordance with box 55. These are compared in decision box 57. If a match is found, then a flag is set to 1 in accordance with box 90.

Box 90 provides a toggle operation for setting a flag on alternate operations. In other words, a binary bit is normally at 0. When a match is detected by decision box 57, the bit toggles to a 1. This indicates that the first incidence of scanning the front cover by the test subject has been detected. It is not appropriate at this stage to consider the magazine as having been "read" for the requisite amount of time. On the first scan of the bar code on the front cover, the time of incidence is determined per box 92 and is stored per box 61. If the flag has been set to 1, then decision box 100 diverts the procedure back to box 51 in which it awaits the next acquisition of a detect code. If, however, the flag is at 0, then this is indicative of the fact that the front cover has been scanned for the second time. Therefore, as decision box 100 answers in the negative, it routes the procedure to box 94 for determining the time difference between the survey issue ID code stored per box 61 and the flag value of 1 just detected. If the requisite threshold is exceeded as determined per box 69, then the incidence of the survey issue ID code is stored per box 59 in the same manner as discussed in detail above for FIG. 2. If the time threshold is not exceeded, indicating that the test subject has not spent the requisite amount of time per the preset threshold, then the incidence is not stored and the exposure of the magazine to the test subject is ignored. Decision box 69 accordingly routes the procedure back to box 51.

If decision box 57 finds no match between the acquired detected code and the stored code for the survey issue, then either a magazine of no interest is being read, or the entered code belongs to a page. This is determined per decision box 98. If the flag has been set to 1 per box 90, then it is established that the front cover of the magazine has been scanned once and the magazine, therefore, is in the process of being read. In such a case, the procedure continues with the routines described in boxes 75, 77, 79 and 81 discussed in detail above. However, if the flag is at 0, then the magazine is not in the process of being read. In such an eventuality, the procedure returns to await the next acquired code per box 51.

If it is desired to monitor a large number of magazines in the survey, then it may not be practical to store in the ROM an ID code for such a large number of survey issues. Accordingly, in such a case the stored code would be only that which identifies magazines. Bar codes have been designed so that the type of goods is identified by the digits located in certain positions in the code. Therefore, only this portion of the code is stored in ROM and recalled per box 53. Box 55 compares only that part of the acquired code which corresponds with the portion identifying the goods with the stored ID code. If a match is found per box 57, then the routine per box 59 stores not the incidence as an accumulated total, but the actual acquired ID code. Each match will result in the assignment of a different memory location in the RAM for the related acquired ID code. More memory capacity in the RAM is, therefore, required with this approach. Likewise, the routine per box 81 would not store the incidence of a particular page ID code as an accumulated total, but the entire ID code for that page would be stored. The object in this approach being the use of the pen to store all the necessary data which can be analyzed by a more powerful computer at a later time. The criteria for whether the data should or should not be stored in the pen is provided within the pen. However, the analysis of whether the test subject was exposed to a magazine of interest for the survey is done by another computer to which the information stored in the pen is transferred. For example, the surveying organization may wish to keep track of up to 250 magazines. The pens distributed to the individuals who are selected as test subjects for a certain sample in the survey are designed to collect data about all magazines, assuming of course that the requisite time is spent on reading them in accordance with the above-described procedure. Once the data from all of these pens has been loaded into the computer, a computer operator can select a particular survey issue of interest and analyze that collected information by, for example, sorting out the survey issue ID codes collected by the test subjects which correspond to the survey issue of interest. Further sophistication can be added to this approach by also keeping track of the personal characteristics of the individual test subjects along with the data they have collected.

In the above-described approaches, the test subject is required to scan both the front cover and the back cover, or the front cover twice. Should he inadvertently not scan the back cover or not perform the second scan of the front cover, the collected data may be inaccurate. For example, if in the FIG. 2 embodiment the back cover ID code is not acquired, then decision box 60 will continue to route data via decision box 63 to box 81 for storing the incidence of page ID code even if the pages are from a different magazine. This is only stopped when the back cover ID code is acquired and decision box 69 routes the procedure back to box 51. Accordingly, it is advisable to keep track of the time elapsed between the time of incidence of the survey issue ID code stored per box 61. If an inordinate amount of time has elapsed, and the length of this time is determined by the length of the magazine, then the data related to this incidence should be removed from memory. Also, it is possible to insure that the pages are in numerical sequence. If they are not, then the test subject either is reading the magazine in an irregular fashion, or the back cover ID code (for example) has not been acquired and the page ID codes may be from another magazine. The procedure for performing these functions is straightforward and within the capability of one with ordinary skill in the art to implement. Accordingly, no further details are deemed necessary.

Based on the above-supplied description, this invention provides a reliable technique for electronically storing the number of times the selected magazine is read by the sample of test subjects for the survey. Moreover, the technique provides a criterion for enhancing the significance of that information by insuring that at least a minimal amount of time was spent by the individual test subject on the magazine before information indicating that the magazine was, in fact, read is stored. Furthermore, individual pages of the magazine can also be monitored as part of the survey. An analysis of information collected in this manner involves combining information on the individual acting as the test subject as to, for example, age, income, sex, geographic location, etc. with his reading habits. Thus, it is possible to determine whether such a person reads the magazine at all, to what extent, which articles attracted his attention, which advertisements were of sufficient interest for him to linger on that page, and the like. By combining information from the entire set of test subjects for a particular survey, it is possible to determine from this test sample, for example, whether an ad has the desired exposure, whether articles carried by the magazine are read, and whether the magazine itself is picked up by as many or more secondary readers as expected.

It should be apparent that although a preferred embodiment of the invention has been described above, several modifications will be readily apparent. For example, it is possible to monitor the amount of time spent on a page of interest to insure that a threshold period has been spent on it. This can be done in the same manner as disclosed above in connection with boxes 65, 67 and 69 related to the time spent between the incidence for the survey issue ID code from the front cover and the incidence for the back cover ID code. Also, it is possible to store the actual time spent on a particular page of interest rather than just the incidence when a threshold is exceeded. The actual time can then be averaged over the number of individuals involved in the test sample for the survey to provide an idea of the time duration spent on that page. Furthermore several magazines can be surveyed simultaneously rather than just one simply by storing their ID codes in the ROM and alotting sufficient memory capacity in the RAM. In addition, switch 31 need not be pressure activated. It can also be activated by flicking or turning a mechanical switch. Also, the ID code need not be a bar code. Conceivably, it could be any type of indicia in print, or even of a magnetic type, that can be detected by a portable scanner. Furthermore, the ID code can be on a label for example, which has been secured to the magazine. In fact, the ID code in some situations can also be associated with the magazine in some other fashion without being affixed to it. For example, the ID code might be on a wrapper, an insert, or on a magazine stand. These and other such modifications are intended to be included within the scope of this invention as defined by the following claims.

I claim:

1. An electronic apparatus for monitoring a selected magazine as to its readership by individuals acting as test subjects involving a survey issue having a first unique code affixed to its front cover and a second unique code affixed to its back cover, comprising:
   sensing means manipulable by the test subjects for detecting said first and second codes;
   first memory means for storing a reference code related to said first and second codes;
   means for comparing the detected first and second codes with said reference code to generate a control signal when a correspondence is found therebetween, respectively;
   second memory means for storing a data signal in response to generation of the control signal by said comparing means,
   time determining means coupled to the comparing means to determine the time difference between a time when a control signal is generated, respectively, for the first and second unique codes; and
   time threshold means for preventing the retention in the second memory means of said data signal when said determined time difference does not exceed a preset time threshold.

2. The electronic apparatus of claim 1, wherein said first code includes a page code affixed to at least some of the pages of said survey issue, with the code affixed to one page being unique relative to all the other pages in said survey issue.

3. The electronic apparatus of claim 2, further including means to store the data signal for pages only if the survey issue is being read.

4. The electronic apparatus of claim 1, wherein said stored data signal comprises a number incremented by one upon the generation of a control signal by the comparing means; and further comprising inhibiting means coupled to the determining means to prevent storage of a data signal for pages if the numbers in the stored data signal for the front and back covers, respectively, are equal.

5. The electronic apparatus of claim 1, wherein the reference code is the same as at least a part of said first code.

6. The electronic apparatus of claim 5, wherein the first code comprises indicia printed on said magazine.

7. The electronic apparatus of claim 1, wherein said data signal comprises a number incremented by one upon the generation of a control signal by the comparing means.

8. The electronic apparatus of claim 1, wherein said data signal comprises the first code detected by said sensing means from the survey issue.

9. The electronic apparatus of claim 8, wherein said first code comprises an identifying code for said survey issue.

10. The electronic apparatus of claim 9, wherein said first code further comprises an identifying code for pages in said survey issue.

11. The electronic apparatus of claim 1, wherein said first code is unique to the survey issue.

12. A method for monitoring a selected magazine as to its readership by individuals selected as test subjects involving a survey issue having a first code associated therewith, comprising the steps of:
   applying said first code to at least one page of a magazine;
   manually manipulating a sensor to detect said first code of a magazine;
   storing a reference code related to said first code;
   comparing the detected first code with said reference code to generate a control signal when a correspondence is found therebetween;
   storing a data signal in response to generation of the control signal; and
   determining the time difference between the generation of a control signal related to front and back covers of the survey issue, respectively, and comparing said time difference with a predetermined time threshold to prevent storage of a data signal if the time difference is less than said time threshold.

13. The method of claim 12, wherein said first code includes a first unique code affixed to the front cover and a second unique code affixed to the back cover.

14. The method of claim 13, wherein the reference code is the same as at least a part of said first code.

15. The method of claim 12, wherein the step of storing said data signal comprises incrementing a number by one upon the generation of a control signal.

16. The method of claim 12, wherein the steps of storing said data signal comprises storing the detected first code.

17. The method of claim 16, wherein said first code comprises an identifying code for said survey issue.

18. The method of claim 17, wherein said first code further comprises an identifying code for pages in said survey issue.

19. The method of claim 12, wherein said first code comprises an identifying code for said survey issue.

20. The method of claim 19, wherein said first code further comprises an identifying code for pages in said survey issue.

21. The method of claim 12, wherein said first code is unique to the survey issue.

22. An electronic apparatus for monitoring a selected magazine as to its readership by individuals acting as test subjects involving a survey issue having a first code associated therewith, comprising:
  sensing means manipulable by the test subjects for detecting said first code of a magazine;
  first memory means for storing a reference code related to said first code;
  means for comparing the detected first code with said reference code to generate a control signal when a correspondence is found therebetween;
  second memory means for storing a data signal in response to a generation of the control signal by said comparing means;
  time determining means for determining the time difference between two occurrences of a generation of a control signal related to the front cover of said survey issue, and means for comparing said time difference with a predetermined time threshold to actuate said inhibiting means to prevent storage of a data signal if the time difference is less than said time threshold.

23. A method for monitoring a selected magazine as to its readership by individuals selected as test subjects involving a survey issue having a first code associated therewith, comprising the steps of:
  applying said first code to at least one page of a magazine;
  manually manipulating a sensor to detect said first code of a magazine;
  storing a reference code related to said first code;
  comparing the detected first code with said reference code to generate a control signal when a correspondence is found therebetween;
  storing a data signal in response to generation of the control signal; and
  determining the time difference between two occurrences of a generation of a control signal related to the front cover of said survey issue, and comparing said time difference with a predetermined time threshold to prevent storage of a data signal if the time difference is less than said time threshold.

* * * * *